United States Patent
Grethel et al.

(10) Patent No.: US 10,738,752 B2
(45) Date of Patent: Aug. 11, 2020

(54) DRIVE TRAIN

(71) Applicant: Schaeffler Technologies AG & Co. KG, Herzogenaurach (DE)

(72) Inventors: Marco Grethel, Bühlertal (DE); Markus Baehr, Bühl (DE); Hyung Wook Choi, Stutensee (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 115 days.

(21) Appl. No.: 15/778,031

(22) PCT Filed: Nov. 22, 2016

(86) PCT No.: PCT/DE2016/200531
§ 371 (c)(1),
(2) Date: May 22, 2018

(87) PCT Pub. No.: WO2017/092745
PCT Pub. Date: Jun. 8, 2017

(65) Prior Publication Data
US 2018/0335006 A1    Nov. 22, 2018

(30) Foreign Application Priority Data

Dec. 2, 2015 (DE) .................. 10 2015 224 102

(51) Int. Cl.
*F02N 11/04*       (2006.01)
*F02N 11/00*       (2006.01)
(Continued)

(52) U.S. Cl.
CPC ............ *F02N 11/04* (2013.01); *B60W 30/20* (2013.01); *F02N 11/006* (2013.01); *H02P 7/298* (2013.01);
(Continued)

(58) Field of Classification Search
CPC .. B60W 30/20; F02D 2400/02; F02N 11/006; F02N 11/04; F02N 2011/0888;
(Continued)

(56) References Cited

U.S. PATENT DOCUMENTS 5,303,681 A * 4/1994 Crofts ................. F02B 75/06
                                                        123/192.1
2002/0117860 A1 * 8/2002 Man .................. B60K 6/365
                                                          290/46

(Continued)

FOREIGN PATENT DOCUMENTS

DE        10110671 A1    9/2002
DE        10110671    *   9/2012 ............ F16F 15/131
(Continued)

OTHER PUBLICATIONS

DE 10110671—English Translation.*
International Search Report for PCT/DE2016/200531, Completed by the European Patent Office dated Mar. 31, 2017, 3 Pages.

*Primary Examiner* — George C Jin
*Assistant Examiner* — Teuta B Holbrook
(74) *Attorney, Agent, or Firm* — Reid A. Baldwin

(57) ABSTRACT

A drive train for a motor vehicle includes an internal combustion engine, a starting device, and a vibration isolation device. The internal combustion engine has a main order of vibration and an excitation frequency predetermined by a predetermined operating principle and a predetermined number of cylinders. The starting device is for starting the internal combustion engine and has an electric machine with a torque characteristic over a speed (n). The vibration isolation device is designed for the main order of vibration of the internal combustion engine. The vibration isolation device has a resonance characteristic below an idling speed (nL) of the internal combustion engine in a resonance range occurring in a first speed range ($\Delta n2$). The (Continued)

resonance range is shifted into a second, lower speed range (Δn1) when the electric machine is coupled. The electric machine is arranged to supply a torque effective beyond the second, lower speed range (Δn1).

18 Claims, 3 Drawing Sheets

(51) Int. Cl.
*H02P 9/08* (2006.01)
*B60W 30/20* (2006.01)
*H02P 9/00* (2006.01)
*H02P 7/298* (2016.01)
*F16F 15/131* (2006.01)
*F02N 11/08* (2006.01)

(52) U.S. Cl.
CPC ............... *H02P 9/008* (2013.01); *H02P 9/08* (2013.01); *F02D 2400/02* (2013.01); *F02N 2011/0888* (2013.01); *F02N 2200/022* (2013.01); *F02N 2300/104* (2013.01); *F16F 15/131* (2013.01)

(58) Field of Classification Search
CPC .......... F02N 2200/022; F02N 2300/104; F16F 15/131; H02P 7/298; H02P 9/008; H02P 9/08
See application file for complete search history.

(56) References Cited

U.S. PATENT DOCUMENTS

| | | | |
|---|---|---|---|
| 2006/0166783 A1 | 7/2006 | Tamai et al. | |
| 2007/0234990 A1* | 10/2007 | Shiino | F01L 1/34 123/179.16 |
| 2009/0025992 A1 | 1/2009 | Hayashi et al. | |
| 2009/0224446 A1* | 9/2009 | Ishiguro | F16F 13/26 267/140.14 |
| 2011/0193504 A1 | 8/2011 | Nakajima et al. | |
| 2014/0076259 A1 | 3/2014 | Fujita | |
| 2014/0102398 A1* | 4/2014 | Orlamunder | F16F 15/12 123/192.1 |
| 2015/0362042 A1* | 12/2015 | Orlamunder | F16F 15/123 123/192.1 |
| 2016/0214616 A1* | 7/2016 | Marutani | B60W 30/20 |

FOREIGN PATENT DOCUMENTS

| | | |
|---|---|---|
| DE | 102012205792 A1 | 12/2012 |
| DE | 102011117395 A1 | 4/2013 |
| DE | 102014201726 A1 | 8/2015 |
| DE | 102014205770 A1 | 10/2015 |
| FR | 2811943 A1 | 1/2002 |

\* cited by examiner

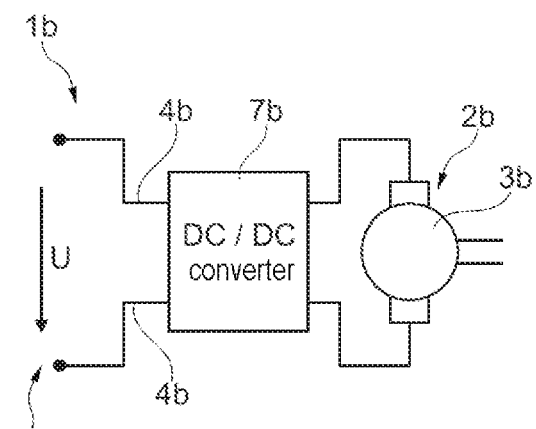
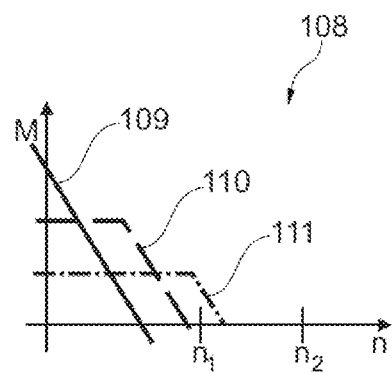
Fig. 6    Fig. 7
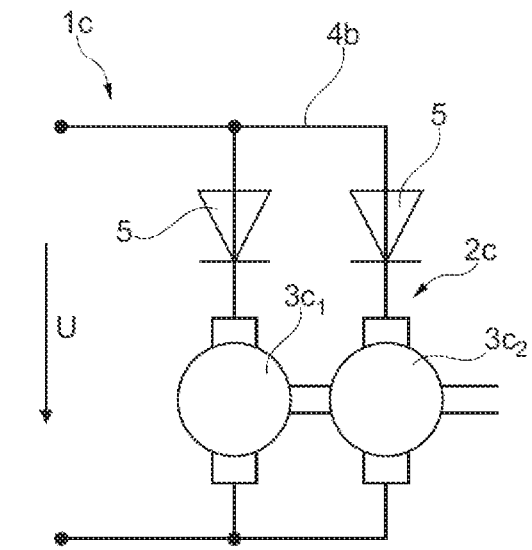
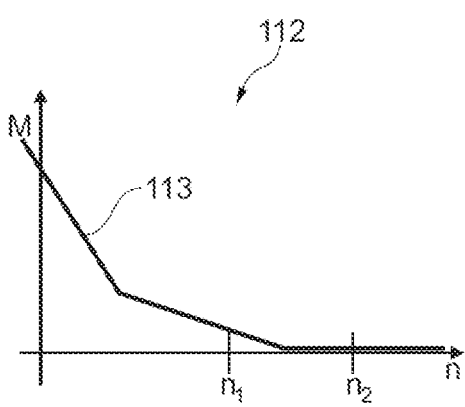
Fig. 8    Fig. 9
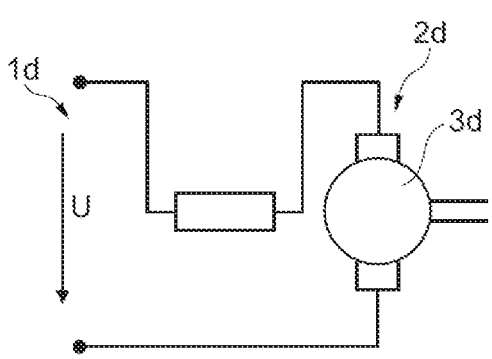
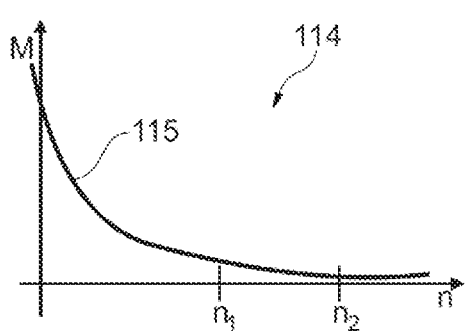
Fig. 10    Fig. 11

DRIVE TRAIN

CROSS-REFERENCE TO RELATED APPLICATIONS

This application is the United States National Phase of PCT Appln. No. PCT/DE2016/200531 filed Nov. 22, 2016, which claims priority to German Application No. DE102015224102.5 filed Dec. 2, 2015, the entire disclosures of which are incorporated by reference herein.

TECHNICAL FIELD

The present disclosure relates to a drive train for a motor vehicle having an internal combustion engine which operates according to a predetermined operating principle and has a crankshaft, a predetermined number of cylinders and a main order of vibration predetermined by the operating principle and the number of cylinders. The main order of vibration has an excitation frequency. The drive train also has a starting device, which starts the internal combustion engine by driving the crankshaft in rotation in a speed range of the excitation frequency. The starting device has an electric machine with a torque characteristic over the speed. The drive train also has a vibration isolation device, arranged downstream of the crankshaft, and designed for the main order of vibration of the internal combustion engine. The vibration isolation device has a resonance characteristic below an idling speed of the internal combustion engine in a resonance range occurring in a first speed range, and the resonance range is shifted into a second, lower speed range when the electric machine is coupled.

BACKGROUND

Drive trains including internal combustion engines which are started by means of a starter have long been known. To start the internal combustion engine, use is made, for example, of "pinion starters" with a permanently excited electric motor, in which a pinion meshes in a starter ring gear connected for conjoint rotation to the crankshaft, wherein a freewheel is arranged between the rotor of the electric motor of the crankshaft in order to avoid high speeds of the electric motor and a generator mode after the starting of the internal combustion engine. Furthermore, vibration isolation devices for vibration isolation of torsional vibrations of the internal combustion engine, e.g. torsional vibration dampers such as dual-mass flywheels, torsional vibration absorbers such as centrifugal force pendulums or the like, and combinations thereof are known. The resonance points of such vibration isolation devices may be designed for speeds below the idling speed of the internal combustion engine in order to a large extent to suppress disturbances during the regular operation of the drive train. However, such resonance points must be overcome during each start of the internal combustion engine, wherein the vibration isolation devices may make the starting of the internal combustion engine more difficult and may themselves be under a high load.

DE 10 2011 117 395 A1 discloses a device in which the vibration isolation device in the form of a dual-mass flywheel is deactivated by means of a locking device during the starting of the internal combustion engine.

BRIEF SUMMARY

The proposed drive train for a motor vehicle has an internal combustion engine that operates according to a predetermined operating principle, e.g. the four-stroke principle of a spark-ignition or a diesel engine or the two-stroke principle, and has a crankshaft. The internal combustion engine has a predetermined number of cylinders, e.g. one to eight cylinders. In particular, the internal combustion engine can have a predetermined number of cylinders that can be shut down during starting or in operating states that require little power. With or without this cylinder shutdown, one, two or three cylinders may be active during starting. Owing to its operating principle, the internal combustion engine is subject to torsional vibrations, due, for example, to momentary torque surges of igniting cylinders, which generate a predetermined main order of vibration with an excitation frequency owing to the operating principle and the number of cylinders.

To start the internal combustion engine, a starting device is provided, which starts the engine by driving the crankshaft in rotation in a speed range of the excitation frequency. The starting device contains an electric machine with a predetermined torque characteristic. The electric machine can be an electric motor, the rotor of which is meshed for conjoint rotation with the crankshaft via a starter ring gear, for example. The starting device can contain a separate starter with at least one electric motor or a starter generator or an electric machine incorporated in a hybrid manner into the drive train.

Arranged downstream of the crankshaft is a vibration isolation device effective over the speed of the internal combustion engine. The vibration isolation device may be a dual-mass flywheel, a single-mass flywheel, a centrifugal force pendulum or the like and optionally a combination thereof, which may be designed for the main order of vibration of the internal combustion engine. The resonance characteristic of the vibration isolation device may be effective at speeds lower than the idling speed. In this case, the resonance range can occur in a first speed range, when the electric machine is decoupled, wherein the resonance range can be shifted into a second, lower speed range when the electric machine is coupled. To improve the resonance properties during starting, the electric machine supplies a torque which is extended effectively beyond the second speed range. Although this torque can be zero, it avoids negative torques, e.g. to form a generator mode of the starting device.

The torque supplied can be damped by means of a damping means. This means that both the mass or mass moment of inertia of the rotor of the electric machine and a damping means are maintained until the resonance curve has decayed to a level which disturbs the starting process only to an insignificant extent. For example, provision can be made for the optionally damping action of the electric machine to be maintained until at least the maximum of the resonance curve damped by the electric machine has been exceeded. A corresponding safety allowance can be provided.

The starting device is advantageously provided as a damping means for the drive train for as long as said device is connected for conjoint rotation to the crankshaft of the internal combustion engine. For this purpose, the torque characteristic of the electric machine can be designed that it supplies a residual torque overspeed switch critical for the resonance behavior, e.g. at least beyond the second and possibly beyond the first speed range, wherein the torque of the electric machine, which decreases with the speed, achieves the damping action and can be regarded as it were as equivalent to a viscous damper.

To ensure the connection of the starting device to the crankshaft for conjoint rotation in both directions of rotation, it can be designed, for example, as a pinion starter without a freewheel, which is subsequently disengaged by a corresponding controller, for example. For this purpose, the pinion starter can be controlled by means of a clutch, e.g. a selector or friction clutch. A starter generator or a hybrid electric machine can be switched to a generator mode at a correspondingly later stage.

Through the damping action of the starting device during the starting of the internal combustion engine, the proposed drive train can be provided with an internal combustion engine which, by virtue of its properties, requires a vibration isolation device, the resonance curve of which is shifted to higher speeds. An internal combustion engine of this kind can be operated by means of the four-stroke principle, for example, which involves one to three cylinders or in which less than four cylinders are activated during starting.

In particular, the torque characteristic of the starting device or electric machine is extended to higher speeds. The damped or undamped starting device therefore makes a torque available at higher speeds than a maximum of the resonance maximum of the vibration isolation device and therefore remains coupled to the drive train until the maximum and, optionally, a safety allowance have been exceeded.

According to an advantageous embodiment of the proposed drive train, the electric machine can be connected for conjoint rotation in both directions to the crankshaft, at least until the second speed range has been traversed. A rotational connection between the rotor of the electric machine and the crankshaft can be designed as helical or spur toothing. As a result, the mass of the rotor and of the components that rotate therewith remains effective as a mass over the relevant part of the resonance curve and the torque characteristic is extended to higher speeds.

To provide an electric freewheel, for example, a flow of current from the electric machine into a power supply device of the electric machine and hence damaging operation of the electric machine as a generator can be prevented. For this purpose, for example, a diode can be inserted into the electrical circuit between the power supply device, e.g. a lead-acid battery, starter battery or the like.

According to another embodiment of the drive train, the torque characteristic can be extended to higher speeds if the starting device has two electric motors with different motor constants connected in parallel.

According to another embodiment, a power supply device which increases the power supply during the starting process of the internal combustion engine can be provided, enabling the torque characteristic of the electric machine to be extended to higher speeds by virtue of the increase in the operating voltage of the electric machine with increasing speed. The operating voltage can be increased by means of a DC/DC converter inserted into the electric circuit, for example. As an alternative or in addition, a separately excited DC motor can be provided, in which the motor constant can be lowered by means of field weakening. As a result, the voltage increases with a falling motor constant, thereby making it possible overall to obtain torques which, although lower over the speed, are extended to higher speeds.

As an alternative or in addition, the electric machine can be designed as a series-wound motor which remains in rotational engagement with the crankshaft beyond the second speed range.

According to an advantageous embodiment, the electric machine can be designed as a DC motor or as a three-phase synchronous motor with a frequency converter. Alternatively, the electric machine can be designed as a three-phase asynchronous motor with a variable frequency drive.

In other words, because of the predetermined damping or the damping which occurs over the operating time, the torque characteristic of an electric machine must provide a residual torque up to higher speeds to ensure that adequate damping is maintained over the entire resonance range while the starting device is connected for conjoint rotation to the crankshaft. The connection between the starting device and the crankshaft is therefore released only at speeds above the resonance range of the drive train without the mass of the starting device being coupled. For this purpose, the torsional strength of the starting device is designed accordingly. Disengagement can be performed either by means of control logic, which evaluates the current speed of the internal combustion engine, the progress of the starting process with respect to time and/or the like.

The coupling of the starting device to the crankshaft for vibration damping or for the purpose of influencing resonance can lead in some cases to high torques at the rotational connection, e.g. toothing, at the higher speeds. It may therefore be appropriate to provide the coupling and decoupling of the starting device by means of a dog clutch instead of an axial movement of a pinion as in a pinion starter. Engagement and disengagement can thereby take place more dynamically since a shorter travel is required. Moreover, the dog geometry can be chosen so that even disengagement under high load or high torque is possible.

A starting process can be implemented, for example, by the driver or a control unit demanding the starting of the internal combustion engine. In the case of a "pinion starter" the starter pinion meshes as usual. As an alternative, a spur-toothed or helically toothed pinion in permanent mesh could be connected to the electric machine by means of a dog clutch.

The rotor of the electric machine begins to turn in order to initiate the starting process. The torque characteristic of the starting device is configured in such a way that it is possible to support the starting process through all critical situations which arise, such as nonuniformity or resonance. This means that the torque characteristic is "long enough" relative to the speed.

As described above and in the figures, this required torque characteristic can be configured and implemented in various ways. In this context, it is envisaged that the starting device supports the starting process until it is completed, irrespective of the starting signal.

BRIEF DESCRIPTION OF THE DRAWINGS

The present disclosure is explained in greater detail by means of the illustrative embodiments shown in FIGS. 1 to 17, wherein:

FIG. 6 shows a simplified circuit diagram of a starting device that is operated with a rising voltage as compared with the starting device in FIGS. 1 and 2, FIG. 7 shows a diagram of the torque characteristic of the starting device in FIG. 6, FIG. 8 shows a simplified circuit diagram of a starting device having an electric machine divided into two, FIG. 9 shows a diagram of the torque characteristic of the starting device in FIG. 8, FIG. 10 shows a simplified circuit diagram of a starting device having a series-wound motor, FIG. 11 shows a diagram of the torque characteristic of the starting device in FIG. 10.

DETAILED DESCRIPTION

Figure 1:
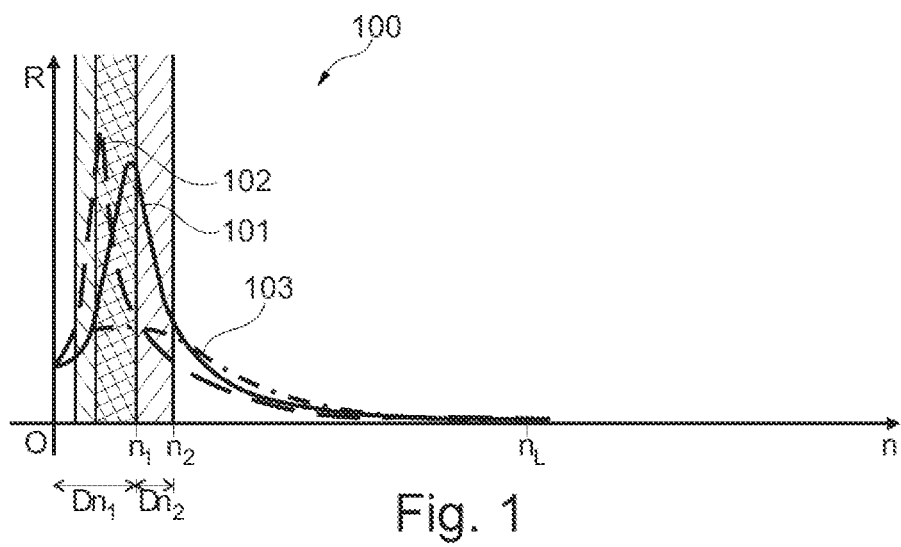
FIG. 1 shows a resonance behavior of a drive train during the starting phase of the internal combustion engine.

FIG. 1 shows the diagram 100 with the resonance behavior R, e.g. a torque, to be transmitted, of the internal combustion engine, torque peaks superimposed on the remainder of the drive train against the speed n of the crankshaft during a starting process of the internal combustion engine by means of a starting device. The resonance characteristics 101, 102, 103 indicate the resonance behavior of the drive train with the vibration isolation device under different conditions. The vibration isolation device is designed as a dual-mass flywheel, for example, the resonance of which is below the idling speed $n_L$. Resonance characteristic 101 indicates the resonance behavior of the drive train without the influence of the starting device. Particularly in the case of internal combustion engines operated in accordance with the four-stroke principle and having fewer than four cylinders, the maximum of the resonance characteristic 101 shifts beyond a speed range $\Delta n_1$ bounded by the speed $n_1$ to higher speeds, in which a torque characteristic of a conventional starting device is no longer sufficient to perform a reliable start since the freewheel thereof is already overrun within the speed range $\Delta n_1$.

Resonance characteristic 102 shows the behavior of the drive train while the starting device is still coupled. Owing to the mass or moment of inertia of the rotor or of all the rotating components of the starting device, the resonance tuning of the vibration isolation device is detuned and shifted to lower speeds, with the result that the maximum of resonance characteristic 102 remains in the speed range $\Delta n_1$. However, resonance characteristic 102 merges into resonance characteristic 101 as soon as the starting device is decoupled by the overrunning of the freewheel.

Resonance characteristic 103 shows the resonance behavior of the drive train in the case of a starting device which is coupled while being damped by means of a damping means. As a result of the damping, which can be caused or intensified by an increasing operating duration, the maximum of resonance characteristic 103 is lowered and broadened, and the maximum thereof is shifted to higher speeds.

In order to avoid or reduce all these influences on the starting behavior, the range of action of the starting device is extended into the speed range $\Delta n_2$. This means that a torque characteristic of the proposed starting device supplies a torque into the first speed range $\Delta n_2$ or to even higher speeds or remains coupled to the crankshaft without switching to the generator mode, in contrast to conventional starting devices, which decouple from the crankshaft already in speed range $\Delta n_1$, owing, for example, to the mechanical freewheel between the rotor and the crankshaft.

FIGS. 2, 4, 6, 8, 10, 12, 14 and 16 each show, in schematic form, advantageous starting devices 1, 1a, 1b, 1c, 1d, 1e, 1f, 1g, which have a torque characteristic extended to higher speeds. FIGS. 3, 5, 7, 9, 11, 13, 15 and 17 show the corresponding diagrams of the torque characteristics thereof over the speed of the crankshaft during a starting process. The starting devices 1a, 1b, 1c, 1d, 1e, 1f, 1g in FIGS. 4, 6, 8, 10, 12, 14 and 16 each have residual torques extended beyond speeds $n_1$ and, where applicable, $n_2$, and therefore they provide damping means corresponding to viscous dampers by virtue of the fall in the torque over the speed, acting with a damping effect on the drive train for as long as the respective starting device 1a, 1b, 1c, 1d, 1e, 1f, 1g is connected for conjoint rotation to the crankshaft.

Figure 2:
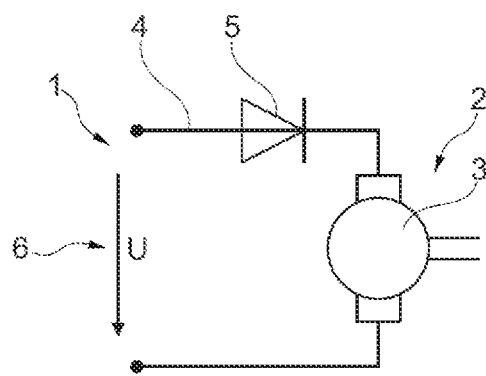
FIG. 2 shows a simplified circuit diagram of a starting device.

FIG. 2 shows, in a schematic illustration, the starting device 1 with the electric machine 2, which is designed in a conventional manner as a permanently excited electric motor 3. In contrast to conventional pinion starters, the electric motor 3 is connected for conjoint rotation to the crankshaft, e.g. to a starter ring gear as the vibration isolation device, such as a dual-mass flywheel, e.g. by means of spur or helical toothing, beyond the speed $n_2$. The starting device can then be operated as a generator or, for example, can be separated from the crankshaft by means of a selector clutch in order to avoid damage to the latter where not designed for high speeds. In order to prevent the generator mode while the internal combustion engine is starting, the diode 5 is inserted in the supply line 4 of the starting device 1 between the power supply device 6 with the voltage U, said diode acting, as it were, as an electric freewheel to prevent a generator effect of the electric motor 3.

Figure 3:
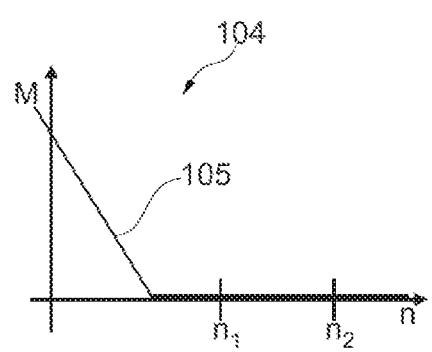
FIG. 3 shows a diagram of the torque characteristic of the starting device in FIG. 1.

The diagram 104 in FIG. 3 shows the torque characteristic 105 of the torque of the starting device 1 in FIG. 2 over the speed n. By virtue of the rotational coupling of the starting device 1 beyond the speeds $n_1$ and $n_2$, the mass of the rotor of the electric motor 3 remains coupled to the crankshaft and hence the vibration isolation device, and therefore the maximum of the resonance behavior of the drive train remains at relatively low speeds and hence reliable starting of the internal combustion engine is ensured, despite the a y drop in the torque M of the electric motor 3. By incorporating damping, e.g. a damping means, such as viscous friction and the like, it is furthermore possible to lower the maximum of the resonance behavior.

Figure 4:
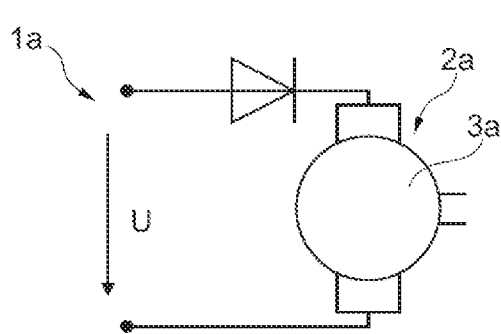
FIG. 4 shows a simplified circuit diagram of a starting device that has been expanded relative to the starting device in FIG. 1.
Figure 5:
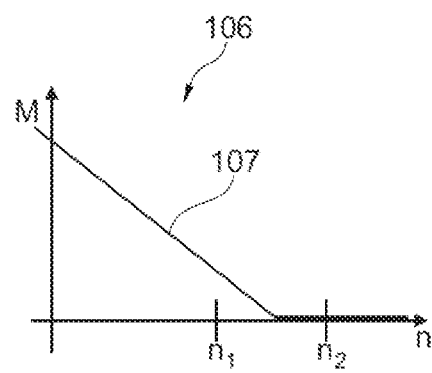
FIG. 5 shows a diagram of the torque characteristic of the starting device in FIG. 4.

As a modification of the starting device 1 in FIG. 2, the starting device 1a in FIG. 4 is provided with the electric machine 2a, the permanently excited electric motor 3a of which has a lower motor resistance with a reduced resistance. For the same starting torque, this leads to a higher starting current and to a higher idling speed. As shown in diagram 106 illustrating the torque characteristic 107 of FIG. 5, the higher power leads to residual torques between speeds $n_1$ and $n_2$, thus ensuring reliable starting.

As a modification of the starting devices 1 and 1a in FIGS. 2 and 4, the starting device 1b in FIG. 6 is provided with the DC/DC converter 7b in the supply lines 4b, between the power supply device 6b and the electric machine 2b, while the electric motor 3b is otherwise similar. The DC/DC converter 7b compensates the voltage drop across the electric motor 3b during the starting mode, with the result that higher idling speeds are achieved.

FIG. 7 shows the diagram 108 illustrating the torque characteristics 109, 110, 111 of the starting device 1b in FIG. 6. Torque characteristic 109 shows the original behavior of the electric motor 3b. With increasing voltage impressed by the DC/DC converter 7b, the idling speeds of the electric motor 3b are increased—as shown in torque characteristics 110, 111—until it exceeds speed $n_1$ in torque characteristic 111.

FIG. 8 shows the starting device 1c, which is formed by an electric machine 2c divided into two with the two permanently excited electric motors $3c_1$ and $3c_2$, which jointly drive the crankshaft, i.e. on a common rotor shaft for example. In this arrangement, the supply lines 4c of the two electric motors $3c_1$, $3c_2$ are provided with diodes 5. The two electric motors $3c_1$, $3c_2$ differ in their motor constant, resulting in different starting torques and idling speeds. In this regard, FIG. 9 shows the diagram 112 illustrating the torque characteristic 113 of the starting device 1c in FIG. 8. Owing to the different motor constants of the electric motors $3c_1$, $3c_2$, the torque characteristic 113 is of two-stage configuration, and the electric motor with the higher starting torque essentially starts the internal combustion engine and the electric motor with the higher idling speed brings about the extension of the torque characteristic beyond speed $n_1$. The rotational coupling of the starting device 1c beyond speed $n_2$ results in a further improvement in the starting behavior of the internal combustion engine.

FIG. 10 shows the starting device 1d, the electric machine 2d of which is designed as an electric motor in the form of the series-wound motor 3d. The series-wound motor 3d has a high starting torque. FIG. 11 shows the diagram 114 illustrating the torque characteristic 115 of the series-wound motor 3d. Torque characteristic 115, which falls continuously over the speed n, has a residual torque which, given appropriate configuration of the series-wound motor 3d is extended over the speeds $n_1$ and $n_2$, thus ensuring that a reliable starting behavior of the internal combustion engine is achieved with starting device 1d.

Figure 12:
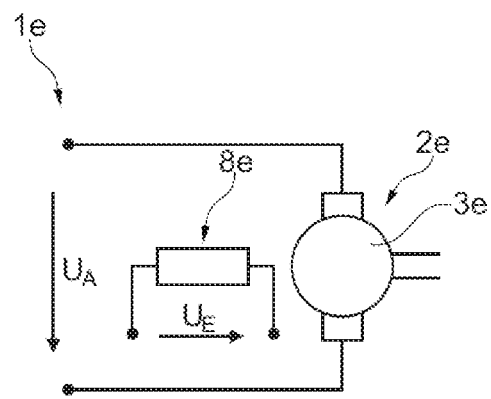
FIG. 12 shows a simplified circuit diagram of a starting device having a separately excited DC motor wound motor.
Figure 13:
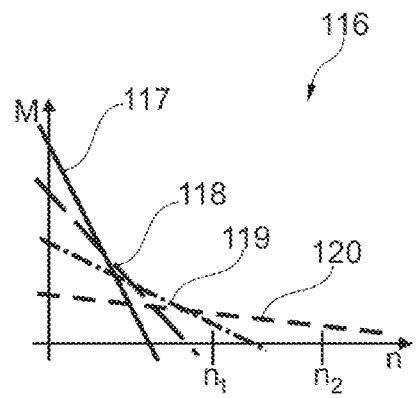
FIG. 13 shows a diagram of the torque characteristic of the starting device in FIG. 12.

FIG. 12 shows starting device 1e in a schematic illustration. The electric machine 2e contains the separately excited DC motor 3e, the motor constant of which is lowered to the excited voltage $U_E$ by means of the field weakening device 8e, controlled by controlling the voltage $U_A$ of the power supply device. By means of the field weakening, a residual torque is achieved at relatively high speeds. The diagram 116 illustrating torque characteristics 117, 118, 119, 120 in FIG. 13 shows the behavior of the DC motor in accordance with the separate excitation thereof. Torque characteristic 117 shows the undisturbed behavior. With increasing disturbance, the excited voltage falls, with the result that, over characteristics 118, 119 and 120, residual torques that go increasingly beyond the speeds $n_1$ and $n_2$ are achieved.

Figure 14:
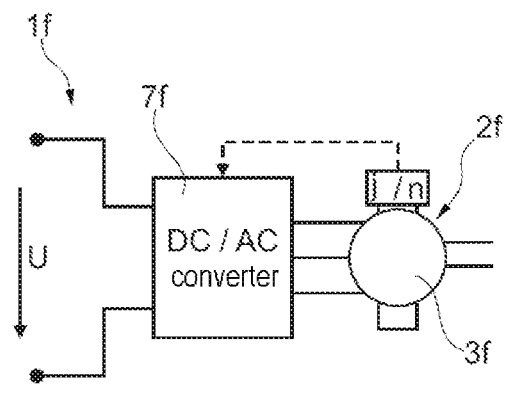
FIG. 14 shows a simplified circuit diagram of a starting device having a synchronously controlled three-phase motor.
Figure 15:
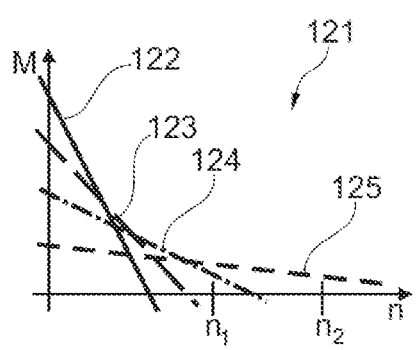
FIG. 15 shows a diagram of the torque characteristic of the starting device in FIG. 14.

FIG. 14 shows starting device 1f, in which the electric machine 2f contains three-phase synchronous motor 3f. Three-phase synchronous motor 3f, e.g. an electronically commutated electric motor, is commutated by means of the DC/AC converter 7f. Through appropriate speed-dependent shifting of the commutation, such as pre-commutation, an effect corresponding to field weakening can be achieved at relatively high speeds. In this regard, FIG. 15 shows the diagram 121 illustrating torque characteristics 122, 123, 124, 125 of the three-phase synchronous motor 3f. Torque characteristic 122 shows undisturbed commutation. Torque characteristics 123, 124, 125 show the development of the torque in the case of increasing pre-commutation with increasing residual torque beyond speeds $n_1$ and $n_2$.

Figure 16:
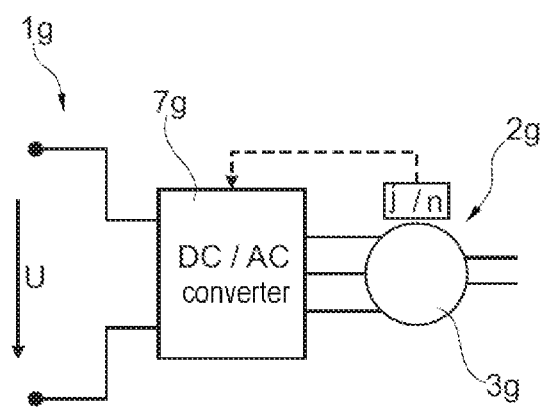
FIG. 16 shows a simplified circuit diagram of a starting device having a three-phase asynchronously controlled motor and FIG. 17 shows a diagram of the torque characteristic of the starting device in FIG. 16.
Figure 17:
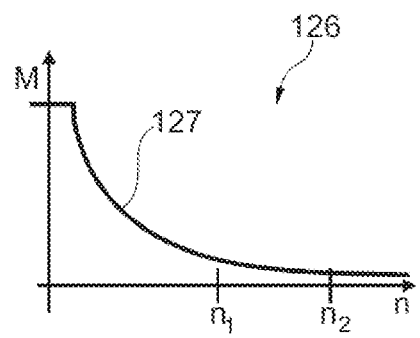

FIG. 16 shows starting device 1g, in which electric machine 2g contains three-phase asynchronous motor 3g. By appropriate control of the three-phase current amplitudes and frequency by means of the DC/AC converter 7g, it is possible to generate a power-limited engine map which provides a residual torque at relatively high speeds. In this regard, FIG. 17 shows the diagram 126 illustrating torque characteristic 127 with a residual torque formed beyond speeds $n_1$ and $n_2$.

LIST OF REFERENCE NUMERALS 1 starting device
1a starting device
1b starting device
1c starting device
1d starting device
1e starting device
1f starting device
1g starting device
2 electric machine
2a electric machine
2b electric machine
2c electric machine
2d electric machine
2e electric machine
2f electric machine
2g electric machine
3 electric motor
3a electric motor
3b electric motor
$3c_1$ electric motor
$3c_2$ electric motor
3d series-wound motor
3e DC motor
3f three-phase synchronous motor
3g three-phase asynchronous motor
4 supply line
4b supply line
4c supply line
5 diode
6 power supply device
6b power supply device
7b DC/DC converter
7f DC/AC converter
7g DC-AC converter
8e field weakening device
100 diagram
101 resonance characteristic
102 resonance characteristic
103 resonance characteristic
104 diagram
105 torque characteristic
106 diagram
107 torque characteristic
108 diagram
109 torque characteristic
110 torque characteristic
111 torque characteristic
112 diagram.
113 torque characteristic
114 diagram 115 torque characteristic
116 diagram
117 torque characteristic
118 torque characteristic
119 torque characteristic
120 torque characteristic
121 diagram
122 torque characteristic
123 torque characteristic
124 torque characteristic
125 torque characteristic
126 diagram
127 torque characteristic
M torque
n speed
$n_1$ speed
$n_2$ speed
$n_L$ idling speed
R resonance behavior
U voltage
$U_A$ voltage
$U_E$ voltage
$\Delta n_1$ speed range
$\Delta n_2$ speed range

The invention claimed is:

1. A drive train for a motor vehicle comprising:
an internal combustion engine which operates according to a predetermined operating principle, the internal combustion engine comprising:
   a crankshaft;
   a predetermined number of cylinders; and,
a main order of vibration predetermined by the predetermined operating principle at the predetermined number of cylinders, the main order of vibration comprising an excitation frequency;
a starting device, arranged downstream of the crankshaft for starting the internal combustion engine by rotating the crankshaft in a speed range of the excitation frequency, the starting device comprising an electric machine with a torque characteristic over a speed (n);
a vibration isolation device, arranged downstream of the crankshaft, designed for the main order of vibration of the internal combustion engine, wherein:
   the vibration isolation device comprises a resonance characteristic below an idling speed (nL) of the internal combustion engine in a resonance range occurring in a first speed range ($\Delta n2$);
   the resonance range is shifted into a second, lower speed range ($\Delta n1$) when the electric machine is coupled; and,
   the electric machine is arranged to supply a torque effective beyond the second, lower speed range ($\Delta n1$); and
a device for power supply to the electric machine to compensate a falling voltage when the internal combustion engine is started.

2. The drive train of claim 1, wherein the starting device is a damping device in the second, lower speed range ($\Delta n1$).

3. The drive train of claim 1, wherein:
the predetermined operating principle is a four stroke principle; and,
during starting of the internal combustion engine, the predetermined number of cylinders is fewer than four.

4. The drive train of claim 1, wherein the electric machine is connected for conjoint rotation with the crankshaft, at least until the first speed range ($\Delta n2$) has been traversed.

5. The drive train of claim 4, wherein a flow of current from the electric machine into a power supply device of the electric machine is prevented.

6. The drive train of claim 5, wherein:
the starting device comprises a first electric motor and a second electric motor with respective motor constants;
the first electric motor motor constant is different than the second electric motor motor constant; and,
the first electric motor and the second electric motor are connected in parallel.

7. The drive train of claim 4, wherein a flow of current from the electric machine into a power supply device of the electric machine is prevented.

8. The drive train of claim 7, wherein:
the starting device comprises a first electric motor and a second electric motor with respective motor constants;
the first electric motor motor constant is different than the second electric motor motor constant; and,
the first electric motor and the second electric motor are connected in parallel.

9. A drive train for a motor vehicle comprising:
an internal combustion engine which operates according to a predetermined operating principle, the internal combustion engine comprising:
   a crankshaft;
   a predetermined number of cylinders; and,
   a main order of vibration predetermined by the predetermined operating principle and the predetermined number of cylinders, the main order of vibration comprising an excitation frequency;
a starting device, arranged downstream of the crankshaft, for starting the internal combustion engine by rotating the crankshaft in a speed range of the excitation frequency, the starting device comprising an electric machine with a torque characteristic over a speed (n); and,
a vibration isolation device, arranged downstream of the crankshaft, designed for the main order of vibration of the internal combustion engine, wherein:
   the vibration isolation device comprises a resonance characteristic below an idling speed (nL) of the internal combustion engine in a resonance range occurring in a first speed range ($\Delta n2$);
   the resonance range is shifted into a second, lower speed range ($\Delta n1$) when the electric machine is coupled;
   the electric machine is arranged to supply a torque effective beyond the second, lower speed range ($\Delta n1$);
   the electric machine is designed as a series-wound motor; and,
   the electric machine remains in rotational engagement with the crankshaft beyond the first speed range ($\Delta n2$).

10. The drive train of claim 9, wherein the starting device is a damping device in the second, lower speed range ($\Delta n1$).

11. The drive train of claim 9, wherein:
the predetermined operating principle is a four stroke principle; and,
during starting of the internal combustion engine, the predetermined number of cylinders is fewer than four.

12. The drive train of claim 9, wherein a flow of current from the electric machine into a power supply device of the electric machine is prevented.

13. The drive train of claim 12, wherein:
the starting device comprises a first electric motor and a second electric motor with respective motor constants;

the first electric motor motor constant is different than the second electric motor motor constant; and, the first electric motor and the second electric motor are connected in parallel.

14. The drive train of claim 13, wherein the starting device is a damping device in the second, lower speed range ($\Delta n1$).

15. A drive train for a motor vehicle comprising:

an internal combustion engine which operates according to a predetermined operating principle, the internal combustion engine comprising:
  a crankshaft;
  a predetermined number of cylinders; and,
  a main order of vibration predetermined by the predetermined operating principle and the predetermined number of cylinders, the main order of vibration comprising an excitation frequency;

a starting device, arranged downstream of the crankshaft, for starting the internal combustion engine by rotating the crankshaft in a speed range of the excitation frequency, the starting device comprising an electric machine with a torque characteristic over a speed (n); and, a vibration isolation device, arranged downstream of the crankshaft, designed for the main order of vibration of the internal combustion engine, wherein;
  the vibration isolation device comprises a resonance characteristic below an idling speed (nL) of the internal combustion engine in a resonance range occurring in a first speed range ($\Delta n2$);
  the resonance range is shifted into a second, lower speed range ($\Delta n1$) when the electric machine is coupled;
  the electric machine is arranged to supply a torque effective beyond the second, lower speed range ($\Delta n1$); and
  a motor constant of the electric machine can be modified by a field weakening device.

16. The drive train of claim 15, wherein the electric machine is selected from the group consisting of:
  a DC motor;
  a three-phrase synchronous motor with a frequency converter; and,
  a three-phrase asynchronous motor with a variable frequency drive.

17. The drive train of claim 15, wherein:
  the predetermined operating principle is a four stroke principle; and,
  during starting of the internal combustion engine, the predetermined number of cylinders is fewer than four.

18. The drive train of claim 15, wherein the electric machine is connected for conjoint rotation with the crankshaft, at least until the first speed range ($\Delta n2$) has been traversed.

* * * * *